Figure 1:
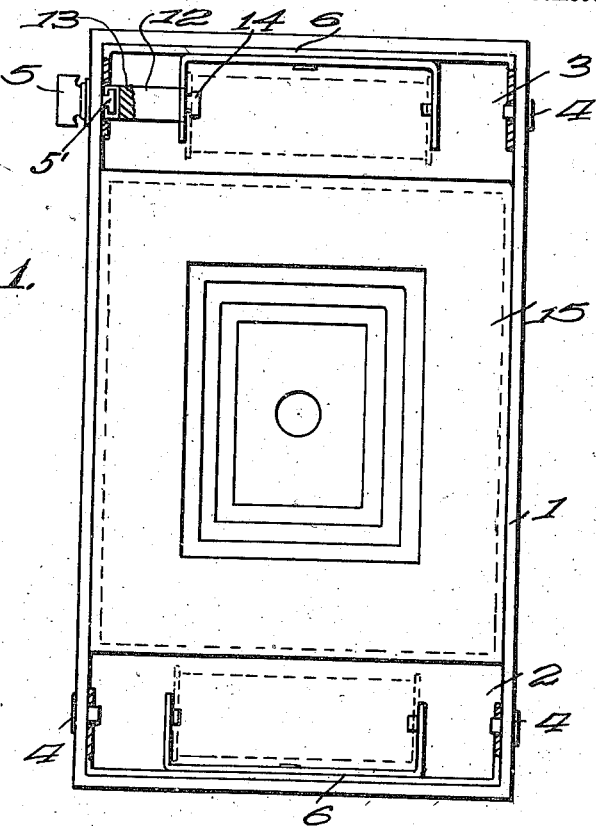

A. L. HARRELL.
FILM HOLDER ATTACHMENT FOR CAMERAS.
APPLICATION FILED AUG. 30, 1917.

1,260,898.

Patented Mar. 26, 1918.

Asa L. Harrell
Inventor

By Geo. P. Kimmel
Attorney

UNITED STATES PATENT OFFICE.

ASA L. HARRELL, OF EASTMAN, GEORGIA.

FILM-HOLDER ATTACHMENT FOR CAMERAS.

1,260,898.   Specification of Letters Patent.   Patented Mar. 26, 1918.

Application filed August 30, 1917. Serial No. 188,960.

*To all whom it may concern:*

Be it known that I, ASA L. HARRELL, a citizen of the United States, and resident of Eastman, in the county of Dodge and State of Georgia, have invented certain new and useful Improvements in Film-Holder Attachments for Cameras, of which the following is a specification.

This invention relates to improvements in camera accessories and it is the principal object of the invention to provide a film roll holding attachment, whereby film rolls varying in size may be used in a single camera without alteration to the construction thereof.

Another and equally important object of the invention is to provide means for insuring the exposure of the proper area of the film arranged in the camera.

Among other aims and objects of the invention may be recited, the provision of a device of the character mentioned with a view to compactness, and in which the number of parts are few, the construction simple, the cost of production small, and efficiency and operation high.

The improvements in the details and arrangement of parts will be apparent from an inspection of the accompanying drawings, in connection with the specific description hereinafter contained, and wherein the preferred embodiment of the invention is disclosed for the purpose of imparting a full understanding of the same.

In the drawings:—

Figure 2:
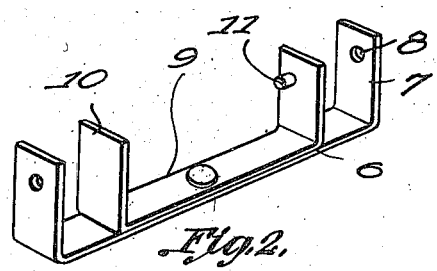

Figure 1 is a rear elevation of a camera with the back thereof removed showing my improved attachment applied thereto, part of the attachment being shown in section; and Fig. 2 is a detail in perspective of the film roll holding brackets.

Similar characters of reference refer to similar parts throughout the several views of the drawings.

Having more particular reference to the drawings, 1 designates the boxing or casing of the camera having film roll receiving compartments 2 and 3 arranged in the opposite ends thereof; the ends of the said compartments being provided with the usual slidable bearing pintles 4 and the slidable film roll turning key 5 having a head 5' formed on its inner end, it of course being understood that the key serves as means for winding the film from one roll to another subsequent to exposure of the same.

The attachment comprises a pair of brackets indicated in their entirety by the numeral 6, which brackets are substantially U-shaped and are formed from several pieces of spring metal having the opposite ends thereof upturned as at 7 and provided with openings 8 for receiving the bearing pintles 4 and the turning key 5 therethrough. A second strip of metal is arranged within the brackets and is designated by the numeral 9. As clearly shown in the Fig. 2, the ends of the strip 9 are upturned as at 10 and certain of the same are provided with bearing pins 11 adapted to be fitted into the openings commonly formed in the ends of film roll spools. In this way, it will be readily understood, that the film rolls will be rotatably supported.

Upon that bracket 6 which is arranged in the compartment 3 having the film roll turning key 5 extending thereinto, a secondary key or connecting key 12 is arranged and has one end thereof slotted as at 13 while the opposite end is provided with a head 14 adapted to be fitted into the slot formed in one end of film roll holding spools now marketed. The head 5' of the key 5 is received in the slotted end of the key 12 and upon rotation thereof, will cause rotation of the particular film roll arranged in its respective compartment. The opposite end of the connecting key 12 are of course journaled in bearings formed in the angularly bent extremities of strips of which the bracket 6 is formed.

As means for exposing only the proper area of the film arranged before the lens of the camera, I provide a mask 15 this mask having an opening therein corresponding to the size of picture which may be produced with the particular film arranged in the camera.

From the foregoing, it will be readily understood by persons skilled in the art that with my improved attachment, I am enabled to employ a single camera for taking pictures varying in size; the attachment rendering it possible to support film rolls of a size smaller than that for which the camera is designed, while by removing the attachment, the proper size of films may be used in the camera, the containing spool, obviously, being engaged with the pintle 4 and the head 5' of the key 5.

Manifestly, the construction shown is capable of considerable modification and such modification as is within the scope of my claim I consider within the spirit of my invention.

I claim:—

In combination with a camera, brackets removably arranged in the film roll receiving compartments thereof, each of said brackets being formed of substantially U-shaped strips of metal varying in length and having their opposite ends arranged in spaced relation, the end of said inner strip of the brackets being adapted to rotatably support film rolls therebetween, and a connecting key rotatably arranged upon one end of one of said brackets and the adjacent end of the inner strip thereof for connecting a film roll to the turning key of the camera.

In testimony whereof, I affix my signature hereto.

ASA L. HARRELL.